(12) United States Patent
Hotchkiss et al.

(10) Patent No.: US 7,041,327 B2
(45) Date of Patent: May 9, 2006

(54) CARBON DIOXIDE AS AN AID IN PASTEURIZATION

(75) Inventors: Joseph H. Hotchkiss, Ithaca, NY (US); Christopher R. Loss, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 421 days.

(21) Appl. No.: 09/912,270

(22) Filed: Jul. 24, 2001

(65) Prior Publication Data

US 2002/0127317 A1    Sep. 12, 2002

Related U.S. Application Data

(60) Provisional application No. 60/220,378, filed on Jul. 24, 2000.

(51) Int. Cl.
   *A23C 3/02* (2006.01)
(52) U.S. Cl. .................. 426/474; 426/477; 426/522; 426/580
(58) Field of Classification Search ............... 426/474, 426/477, 522, 580
   See application file for complete search history.

(56) References Cited

U.S. PATENT DOCUMENTS

| | | | |
|---|---|---|---|
| 3,328,178 A | 6/1967 | Alderton | 99/215 |
| 3,454,406 A | 7/1969 | Alderton | 99/215 |
| 4,804,552 A | 2/1989 | Ahmed et al. | 426/580 |
| 4,919,960 A | 4/1990 | Ahmed et al. | 426/580 |
| 5,431,939 A | 7/1995 | Cox et al. | 426/300 |
| 5,716,811 A | 2/1998 | Nauth et al. | 435/71.2 |
| 5,972,394 A * | 10/1999 | Kato et al. | 426/46 |
| 6,403,129 B1 * | 6/2002 | Clark et al. | |
| 6,461,633 B1 * | 10/2002 | Kawakami et al. | 424/439 |
| 2002/0044994 A1 * | 4/2002 | Spencer | 426/312 |

FOREIGN PATENT DOCUMENTS

JP    2001259002    9/2001

OTHER PUBLICATIONS

Derwent Abstract. Acc. No. 200-678057. For RU 2151515 published Jun. 27, 2000.*

Ruas-Madiedo, P., et al., "Preservation of the Microbiological and Biochemical *Quality of Raw Milk* by Carbon Dioxide Addition: A Pilot-Scale Study", *Journal of Food Protection*, 59:5, (1996), pp. 502-508.

Binnig, Rupert., "Die Wirkung von CO2 beim Pasteurisieren von Fruchtsaften", *Flussiges Obst*, (1980), pp. 134-139 (w/ English Abstract).

Devlieghere, F., et al., "Concentration of Carbon Dioxide in the Water-Phase as a Parameter to Model the Effect of a Modified Atmosphere on Microorganisms", *International Journal of Food Microbiology*, 43, (1998), pp. 105-113.

Dixon, N.M., et al., "The Inhibition of CO2 of the Growth and Metabolism of Microorganisms", *The Journal of Applied Bacteriology*, 67, (1989), pp. 109-136.

Grant, I.R., et al., "Effect of High Temperature, Short-Time (HTST) Pasteurization on Milk Containing Low Numbers of Mycobacterium Paratuberculosis", *Letters in Applied Microbiology*, 26, (1998), pp. 166-170.

King, J.S., et al., "Preservation of Raw Milk by the Addition of Carbon Dioxide", *The Journal of Dairy Research*, 49, (1982), pp. 439-447.

Marshall, Robert T., *Standard Methods for the Examination of Dairy Products, 16th Edition*, (1992), Table of Contents.

Meng, Yizhi., et al., "Manual for Manometric Method for the Analysis of CO2 in Dairy Products", (1998), pp. 1-8.

Michalski, C.B., et al., "Use of Capillary Tubes and Plate Heat Exchanger to Validate U.S. Department of Agriculture Pasteurization Protocols for Elimination of *Salmonella enteritids* from Liquid Egg Products", *Journal of Food Protection*, 62:2, (1999), pp. 112-117.

Nilsson, L., et al., "Carbon Dioxide and Nisin Act Synergistically on *Listeria monocytogenes*", *Applied and Environmental Microbiology*, 66:2, (2000), pp. 769-774.

* cited by examiner

*Primary Examiner*—Anthony Weier
(74) *Attorney, Agent, or Firm*—Schwegman, Lundberg, Woessner & Kluth, P.A.

(57) ABSTRACT

The present invention provides processes to inhibit or reduce the growth of bacteria and other pathogens in a liquid by adding carbon dioxide ($CO_2$) to the liquid, and thermally inactivating the bacteria and other pathogens in the liquid, wherein the added $CO_2$ cooperates with the thermal inactivation process so that the efficacy of the thermal inactivation process is enhanced.

10 Claims, 5 Drawing Sheets

CARBON DIOXIDE AS AN AID IN PASTEURIZATION

This application claims benefit of Provisional Application No. 60/220,378, filed on Jul. 24, 2000.

BACKGROUND OF THE INVENTION

Assuring the safety of fluid milk, related dairy products and juices while maintaining quality and increasing the shelf life of products is a significant challenge for the food industry. Thermal inactivation of spoilage and pathogenic microorganisms (i.e. Thermal pasteurization) is the most widely used method to achieve these goals. For nearly 100 years milk and other foods have been thermally pasteurized to inactivate microorganisms which might cause human disease (i.e., to make milk safer) and to inactivate inherent enzymes and spoilage microorganisms (i.e., to make milk last longer).

Unfortunately, thermal pasteurization can have detrimental effects on flavor and nutritional quality. Although thermal pasteurization improves safety and prolongs shelf life, it often causes a decrease in flavor quality (cooked flavor), nutritional content (vitamin loss), and other quality factors (brown color). Additionally, recent research suggests that a heat resistant strain of the milk-borne pathogen *Mycobacterium paratuberculosis* may survive current pasteurization conditions (Grant et al., 1998).

Many attempts to mitigate the undesirable effects while maintaining the desirable effects of thermal pasteurization have been undertaken. Nearly all of this work has focused on improved methods of transferring heat into and out of the product to minimize thermal damage. For example, dozens of improved heat exchangers have been designed including processes known as HTST (high temperature short time) pasteurization and, more recently, UHT (ultra high temperature) processing.

An alternative approach would be to re-formulate the product (e.g., milk) to enhance the effect of heat on microbial death. For example, lowering the pH by adding an acid increases the rate of microbial inactivation. It is well known that reducing pH causes an increase in the thermal death of microorganisms but the addition of mineral or organic acids for this purpose is not acceptable under current regulations (Pasteurized Milk Ordinance, 1995). Thus, although this approach has been amply demonstrated, it has not been practiced because whatever is currently known to be effective when added to the milk would remain in the milk and ultimately be consumed. Regulations around the world prohibit such additives, especially in the case of milk.

Shelf life is also a major issue facing the industry. Many companies that choose to increase the heat treatment of their product to produce a product having a lengthened shelf life do so at a considerable expense and a loss of flavor quality.

What is needed is a process that assures food safety, maintains quality, and improves shelf life with minimal product damage.

SUMMARY OF THE INVENTION

The present invention provides a process to inhibit or reduce the growth of bacteria and other pathogens in a liquid, comprising adding carbon dioxide ($CO_2$) to the liquid; and thermally inactivating the bacteria and other pathogens in the liquid, wherein the added $CO_2$ cooperates with the thermal inactivation process so that the efficacy of said thermal inactivation process is enhanced.

The present invention further provides a process to enhance the efficacy of a thermal inactivation process for a liquid, comprising the addition of carbon dioxide ($CO_2$) to the liquid; and thermally processing the liquid, wherein the added $CO_2$ cooperates with the thermal inactivation process so that the death rate of bacteria and other pathogens in the liquid is increased over the death rate of bacteria and other pathogens as a result of thermal inactivation carried out in the absence of the added $CO_2$.

The present invention also provides a process to reduce undesirable biological changes in a liquid, wherein the process comprises adding carbon dioxide ($CO_2$) to the liquid; and thermally inactivating the bacteria and other pathogens in the liquid, so that the added $CO_2$ cooperates with the thermal inactivation process in order to enhance the efficacy of said thermal inactivation process.

The present process can effectively increase the shelf life of a wide variety of products, e.g., a dairy product, a vegetable juice, a fruit juice, a plant extract, a fungal extract, flavoring agents, or a combination thereof.

Flavoring agents amenable to treatment by the present process include one or more flavoring agents, including a fruit flavor, vegetable flavor, chocolate flavor, vanilla flavor, soft drink flavor, or malt flavor.

The present invention also provides products produced by the processes described herein.

The inhibitory effect per se of $CO_2$ on the growth of spoilage and pathogenic bacteria found in dairy products has been well documented over the past century. The concept of using $CO_2$ to inhibit the growth of unwanted microorganisms in dairy products stems from the technology of modified atmosphere packaging (MAP). This method of shelf life extension has been adapted to fluid dairy products by directly injecting the active gas ($CO_2$) thereby enhancing its inhibitory effect.

The direct post-pasteurization addition of carbon dioxide (DAC) to neutral and acidic pH products can be used to control contaminating organisms. DAC is now widely used by cottage cheese processors in North America. In fact, cottage cheese manufacturers in the U.S. are utilizing DAC to extend the shelf life by as much as 6 weeks. A considerable amount of data has shown that bacterial growth rates decrease and lag phase increase due to dissolved $CO_2$ (Devlieghere et al., 1998; Nilsson, 2000; King and Mabbitt, 1982).

Carbon dioxide has also been shown to extend the shelf life of yogurt, to improve the keeping quality of raw milk and to extend yields of cheese subsequently prepared from such milk. In general, $CO_2$ dissolved in the aqueous phase of a growth medium extends the lag phase of common gram-negative psychotrophic spoilage and pathogenic organisms (such as *Pseudomonas fluorescens* and *Listeria monocytogenes*). Many putative mechanisms for this inhibition have been presented: intracellular pH depression (due to carbonic acid), physiochemical disruption of enzymatic activity, and energy and nutrient imbalance due to disruption of the lipid bi-layer of the bacterial cell wall.

DETAILED DESCRIPTION OF THE INVENTION

Figure 1:
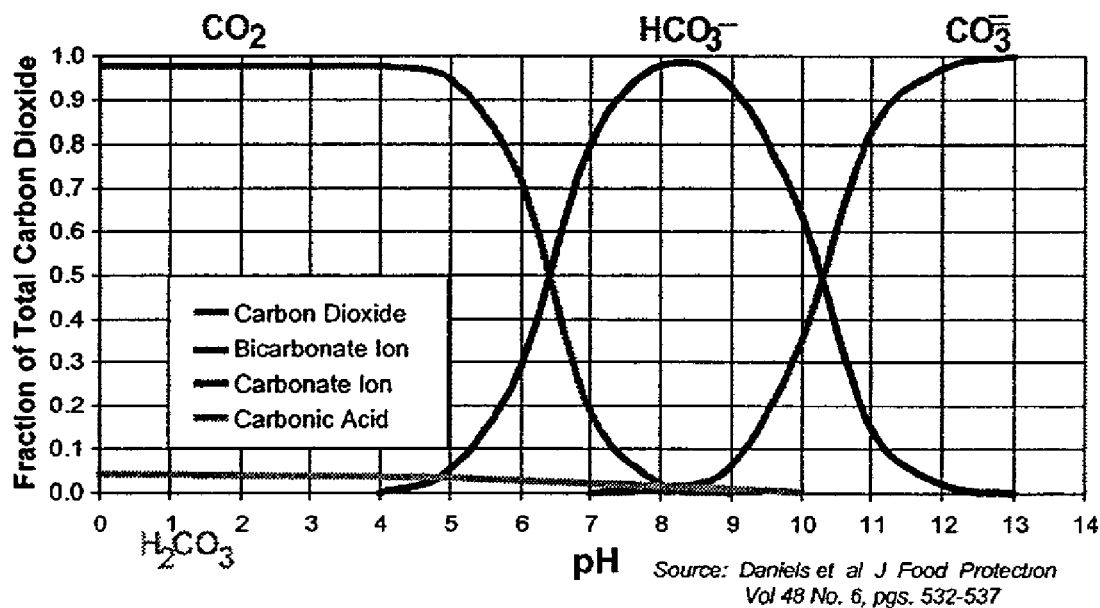
FIG. 1 is a graph showing the relative amounts of $CO_2$, $HCO_3^-$, and $CO_3^=$ as dependent on pH.

The process of the present invention is applicable to a wide variety of fluids, liquids, semi-solids, and solids, and yields a wide variety of improved products. The present invention is especially applicable to liquid food ingredients, intermediates, and products.

For example, the present invention is applicable to any dairy product, including, but not limited to, cream, light cream, light whipping cream, heavy cream, heavy whipping cream, whipped cream, whipped light cream, sour cream, acidified sour cream, cultured sour cream, half-and-half, sour half-and-half, acidified sour half-and-half, cultured sour half-and-half, reconstituted or recombined milk and milk products, concentrated milk, concentrated milk products, whole milk, reduced fat or low fat content milk (e.g., 1% fat milk, 2% fat milk, etc.), nonfat (skim) milk, frozen milk concentrate, eggnog, buttermilk, cultured milk, cultured reduced fat or lowfat milk, cultured nonfat (skim) milk, yogurt, lowfat yogurt, nonfat yogurt, acidified milk, acidified reduced fat or lowfat milk, acidified nonfat (skim) milk, low-sodium milk, low-sodium reduced fat or lowfat milk, low-sodium nonfat (skim) milk, lactose-reduced milk, lactose-reduced reduced fat or lowfat milk, lactose-reduced nonfat (skim) milk, aseptically processed and packaged milk and milk products, milk, reduced fat or lowfat milk or nonfat (skim) milk with added safe and suitable microbial organisms and any other milk product made by the addition or subtraction of milkfat or addition of safe and suitable optional ingredients for protein, vitamin or mineral fortification of milk products defined by governmental regulation.

The present invention is applicable to evaporated and condensed forms of whole milk, reduced fat or low fat content milk (e.g., 1% fat milk, 2% fat milk, etc.), non-fat milk (skim milk), as well concentrated, reconstituted or recombined milk-and/or milk products.

The present invention is also applicable to other products derived from dairy ingredients, including whey and whey products, caseinates, lactalbumin, cheeses and cheese products, cottage cheese, ice cream mix, ice milk mix, yogurt mix, shake mixes, batter mixes, and other dairy mixes, probiotic dairy products, including milk treated with *Lactobacillus* cultures or *Acidophilus* cultures, flavored milks, spreads, dips, sauces, eggnogs, flavored creamers, boiled custards, puddings, cheesecakes, milkshakes, smoothies, dairy shakes, and other shakes, as well as other products containing milk or other ingredients derived from dairy products.

Dairy products which have been retort processed after packaging or which have been concentrated, condensed, or dried are also applicable to the present invention.

The present invention is applicable to milk and milk-like products derived from crop plants or grains, including but not limited to soy, rice, wheat, corn, and oats.

The present invention is also applicable to products that are required by governmental regulation to be made from pasteurized products.

The present invention is applicable to avian eggs, including both in-shell and liquid preparations. The present invention is also applicable to products containing added nutritional components, e.g., protein, minerals, vitamins, fat, fiber, sugars, salts, starches, amino acids, and alcohols.

The present invention is further applicable to milk and products derived from the milk of bovine species, goats and sheep.

The present invention is also applicable to water, carbonated water, and products containing water, as well as a variety of beverages and drinks. The present invention is also applicable to fermented foods, food products, and beverages.

The present invention is also applicable to juices, extracts, liquid supplements, and liquid pharmaceuticals derived from fresh, dried, frozen or canned plants, vegetables, fruits, grasses, yeasts, fungi, and combinations thereof, including but not limited to juices or extracts derived from apples, apricots, pineapples, peaches, bananas, oranges, lemons, limes, grapefruit, plums, cherries, grapes, raisins, prunes, nectarines, kiwi, star fruit, papayas, mangos, blueberries, raspberries, strawberries, choke cherries, boysenberries, cranberries, lingenberries, melons, tomatoes, carrots, onions, garlic, celery, lettuce, cucumbers, radishes, broccoli, potatoes, sweet potatoes, yams, cauliflower, brussel sprouts, cabbage, rutabaga, corn, peas, green beans, yeast, including brewer's yeast, and mushrooms. The present invention also is applicable to blended, liquefied whole plants, fruits, vegetables, grasses, yeasts, fungi, and combinations thereof, including but not limited to the whole plants, fruits, vegetables, grasses, yeasts, fungi disclosed hereinabove.

The present invention may be applicable to a mixture of a liquid dairy product, e.g., skim milk, and one or more juices, extracts, liquid supplements, and liquid pharmaceuticals.

The amount of vegetable, fruit, yeast or fungal juice, or combination thereof, in the product can be between 0.05% to 100%, preferably between 0.1% to 75%.

The present invention may further be applicable to products containing any added flavoring agent, including any of the usual flavors, such as a fruit flavor (natural or artificial, or both), vegetable flavor, chocolate flavor, vanilla flavor, and any of the usual soft drink flavors, such as the cola flavor, ginger ale flavor, etc., or a traditional malt flavor.

In general, the terms "thermal inactivation," "pasteurization," "pasteurized" and similar terms as used throughout this application, may be defined as the application of mild heat for a specified time to a liquid to enhance its keeping properties and to destroy any harmful microorganisms present. For milk, the times and temperatures employed may be based upon the thermal tolerance of *Mycobacterium tuberculosis*, a heat-resistance, non-spore-forming pathogen. (McGraw-Hill Concise Encyclopedia of Science and Technology, 4th ed. (1998)).

The terms "thermal inactivation," "pasteurization," "pasteurized" and similar terms as used throughout this application, may also be defined as the process of heating every particle of liquid, in properly designed and operated equipment, to one of the temperatures given in the following chart and held continuously at or above that temperature for at least the corresponding specified time (see Table 1, below):

TABLE 1

| Temperature | Time |
| --- | --- |
| *63° C. (145° F.) | 30 minutes |
| *72° C. (161° F.) | 15 seconds |
| 89° C. (191° F.) | 1.0 second |
| 90° C. (194° F.) | 0.5 second |

TABLE 1-continued

| Temperature | Time |
| --- | --- |
| 94° C. (201° F.) | 0.1 second |
| 96° C. (204° F.) | 0.05 second |
| 100° C. (212° F.) | 0.01 second |

*If the fat content of the milk product is 10 percent or more, or if it contains added sweeteners, the specified temperature shall be increased by 3° C. (5° F.).
Eggnog shall be heated to at least the following temperature and time specifications:

| | |
| --- | --- |
| 69° C. (155° F.) | 30 minutes |
| 80° C. (175° F.) | 25 seconds |
| 83° C. (180° F.) | 15 seconds |

Nothing shall be construed as excluding any other pasteurization process, which has been recognized by any government agency to be equally efficient, and which is approved by the regulatory agency.

Two types of thermal inactivation applicable for use with the present methods and products are High Temperature-Short Time (HTST) pasteurization and Ultra High Temperature (UHT) treatment.

HTST, a pasteurization process, is designed to effectively eliminate pathogenic organisms but not destroy all microorganisms. This is process is often used on milk and fruit juices and products designed to be stored under refrigeration conditions. Ultra High Temperature (UHT) treatment is designed to eliminate all organisms capable of growing in a product. This process can be used on products designed to be stored at room temperature.

There are differences in the method of heat treatment within each type, but the difference is only in the method in which the heat is transferred to the product. The outcome and the amount of heat are the similar in all processes. The processes and products of the present invention apply to all types of heat treatment, including pasteurization (HTST) and UHT.

The term "shelf life" is defined as the amount of time a product remains acceptable for organoleptic, nutritional, and/or safety purposes, for the consumer or the retailer.

The term "undesirable biological changes" includes changes in the liquid or product such that the liquid or product is unacceptable for organoleptic, nutritional, and/or safety purposes, for the consumer. These changes may include, but are not limited to, changes in the color (brown color), decreases in the flavor quality (cooked flavor), and decreases in the nutritional content (i.e., vitamin loss).

The term "liquid" is defined as being a fluid or semi-fluid, e.g., a pourable or flowable substance intended for human or animal consumption.

The terms "pathogens" and "food pathogens" are defined to include microorganisms, bacteria, viruses, and fungi, including but not limited to psychotrophic bacteria; lipolytic psychotrophic bacteria; proteolytic psychotrophic bacteria; mesophylic bacteria; *Bacillus* species, including *B. cereus*; *Clostridium* species, including *C. perfringens* and *C. botulinum*; *Cryptosporidium* species; *Campylobacteria* species, including *C. jejuni*; *Listeria* species, including *L. monocytogenes*; *Escherichia* species, including *E. coli* and pathogenic *E. coli* strains; *Mycobacterium* species, including *M. paratuberculosis*; *Pseudomonas* species, including *P. fluorescens*; *Helicobacteria* species; *Yersinia* species, including *Y. entercolitica*; *Arcobacter* species; *Aeromonas* species; *Toxoplasma* species, including *T. gondii*; *Streptococcus* species; *Staphylococcus* species, including *S. aureus*; *Shigella* species; *Salmonella* species, including *S. enteritidis, S. Montevideo, S. typhimurium*; *Cyelospora* species, including *C. cayetanensis*; *Cignatera* species; *Vibrio* species; *Plesiomonas* species; *Entamoeba* species, including *E. histolytica*; Hepatitis viruses; Astroviruses; Calciviruses; enteric Adenoviruses; Parvoviruses; and Rotaviruses.

The term "efficacy" as it applies to a thermal inactivation process and is used herein means the ability to produce a desired effect. Efficacy is determined by the amount of heat applied (i.e., temperature) combined with the duration (i.e., time) of heating. Different combinations of temperature and time may have the same destructive effect on microorganisms. This invention reduces the time and/or temperature that must be applied to reduce microorganisms to a given level.

The term "death rate," as is used herein, is defined as the rate at which microorganisms are inactivated at a given temperature.

$CO_2$ is a ubiquitous environmental bacterial stress. In accord with the present invention, purified $CO_2$ may be safely and inexpensively utilized in conjunction with, or in combination with, thermal inactivation process to improve overall quality and safety of dairy products, as well as other liquid and non-liquid products, juices, extracts, liquid supplements, and liquid pharmaceuticals. The combination of two antimicrobial techniques may result in a synergistic effect.

The present invention comprises the addition of $CO_2$ to a product prior to, and/or simultaneously with, thermal inactivation. Prior to thermal inactivation, preferably food grade $CO_2$ gas is added to the product by sparging or bubbling, preferably to obtain levels of about 400–2000 ppm. At this level of $CO_2$, the amount of microbial death that occurs during heating in a normal HTST process is preferably increased by 10–90%, or more preferably 35–60%, or most preferably 40–50%, over thermal inactivation carried out without the addition of $CO_2$ prior to the thermal inactivation step. To ensure that the appropriate amount of $CO_2$ has been added, the $CO_2$ content of the product is measured using the detection method disclosed in Example 1 (below) prior to thermal inactivation. After the completion of the thermal inactivation process, the free $CO_2$ is removed. $CO_2$ is in equilibrium with carbonic acid in solution and the pH depends on the concentration of dissolved $CO_2$. $CO_2$ is in equilibrium with the atmosphere above the solution (the headspace) prior to thermal inactivation and thus, $CO_2$ can be easily removed by drawing a mild vacuum on the solution.

In this way, $CO_2$ may be used to decrease pH and then the excess $CO_2$ may be removed from milk or other products by vacuum. If used in this manner, $CO_2$ is a processing aid, and does not become a part of the product or act as a direct additive.

There may be additional benefits to adding $CO_2$ prethermal inactivation. Mild thermal treatment of raw milk, destined for cheese fermentation, containing dissolved $CO_2$ may result in sufficient thermal death to render the ingredient safe, while leaving desirable quality factors intact. Some inherent enzymes, for example, desirable in cheese production are not likely to be sensitive to elevated $CO_2$.

The present invention provides for enhanced efficiency of pasteurization (e.g., increased thermal destruction under present pasteurization conditions). Additionally, the present invention provides for similar destruction of pathogens with less heat input and fewer undesirable changes in the milk.

EXAMPLES

This experiment was conducted to determine whether low levels of dissolved $CO_2$ significantly affected the thermal destruction of a common milk spoilage organism. The capillary tube method was used (Michalski et al., 1999) to construct thermal death time curves for *Pseudomonas fluorescens* R1-232 (isolated from milk) in sterile milk containing dissolved $CO_2$ at 660 to 1580 ppm.

A. Materials and Methods
  1. Culture Preparation

The Food Safety and Milk Quality lab at Cornell University provided a milk isolate of *Pseudomonas fluorescens* R1-232. It was characterized by Biolog and API Zone (for substrate utilization) tests and was positive for protease, lipase, and lecithinase activity. Species and genus were confirmed by ribotyping.

A single colony of *Pseudomonas fluorescens* R1-232 was streaked onto a trypticase soy agar (TSA; BBL, Becton, Dickinson, and Company, Maryland, U.S.A.) plate and incubated (VWR, 1530 Incubator, Shel-Lab, Cornelius, Oreg.) at 29° C. for 36 h. Seventy-five ml of trypticase soy broth (TSB; BBL, Becton Dickson, Maryland.) was inoculated with an single colony from this plate and incubated in a shaker water bath (Blue-M, Blue Island, Ill.), speed setting 8, at 29° C., for 24 h. Fresh TSB was inoculated to obtain approximately $10^4$ cells per ml and incubated again for 24 h under the same conditions. Two 75 ml flasks of TSB were inoculated at the same levels as above and incubated for 16 h (ave. $OD_{650}$=1.2). These broths were centrifuged (International Clinical Centrifuge, Needham Heights, Mass.) at 2,140 rpm for 40 minutes, the supernatant poured off, and pelleted cells pooled together and held at 5° C.

B. Carbon Dioxide Treatment, Analysis, and Capillary Tube Preparation

Three hundred ml of 2to milk (Cornell University Dairy) was autoclaved (121° C.) in a 500 ml Erlenmeyer flask for 15 min and cooled to 4° C. A sterile stainless steel sparging stone was used to bubble $CO_2$ gas through the autoclaved milk to obtain levels of 660, 920, and 1580 ppm. Treated or control (no added $CO_2$) milk was then added to a sterile 50 ml screw top vial fitted with a rubber septa. The pooled pelleted cells were then divided evenly between control and test vials to obtain levels of $10^7$–$10^8$ CFU/ml and held on ice.

A 3 cc sterile syringe (Becton Dickson, Rutherford, N.J.) fitted with 20 gauge needle (Becton Dickson, Rutherford, N.J.) was used to aseptically draw inoculated milk from the septa fitted vial. Inoculated milk (0.100±0.002 grams) was injected into glass capillary tubes (1.6–1.8 mm×100 mm, Kimax-51, Kimble Products, USA). A propane torch was used to seal both ends of the capillary tubes after filling. Sealed tubes were held at 4° C. until use. The $CO_2$ content of the remaining milk in the vial was determined using the infrared detection method (Mehng, 1998 as detailed hereinbelow) and a Mocon infrared $CO_2$ analyzer (Pac Check 200, Minneapolis, Minn.). Temperature and pH was measured using an Accumet pH Meter (Fisher Scientific, USA).

1. Analytical Method to Determine Dissolved $CO_2$ in Dairy Products $CO_2$ is quite soluble in water and even more soluble in non-polar materials such as the lipids in foods. $CO_2$ forms acids when dissolved in water resulting in a pH of about 4 when the water is saturated. Most $CO_2$ in water exists as $CO_2$ but small amounts of $H_2CO_3$ (carbonic acid) are formed from the reaction of $CO_2$ with $H_2O$. A portion of the $H_2CO_3$ formed dissociates into $H^+$ and $HCO_3^-$ (bicarbonate ion). $HCO_3^-$ can further dissociate to $CO_3^=$ and $H^+$. These equilibria and their equilibrium constants are given in the following equations.

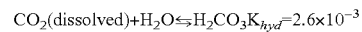

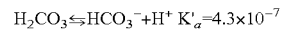

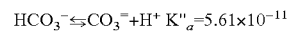

The relative amounts of each chemical species in a given dairy food will depend on the pH as shown in FIG. 1. The ionic forms are quite soluble in water as compared to $CO_2$. So as the pH of the diary food is lowered below 5.0 the equilibria is driven towards $CO_2$ and away from the ionic forms. Agitation, such as stirring, drives the $CO_2$ into the gas phase above the product and in a closed system increases the amount of $CO_2$ in the headspace. In the instrumental method, a sample of the headspace is withdrawn by syringe and injected into an instrument which measures the $CO_2$ concentration. A standard curve is constructed by adding sodium bicarbonate to a dairy product.

a. Equipment

Oxygen/Carbon Dioxide Analyzer: Mocon Pac Check Model 550 or 650. Modern Controls, Inc. 7500 Boone Avenue North, Minneapolis, Minn. 55428. (612) 493-7236; Gastight syringe with luer tip and needle: 10 mL (B-D 2443, Fisher Scientific, Springfield, N.J.) or equivalent; Syringe filter and threaded luer; Erlenmeyer flasks: 125 mL, Pyrex; Septa, white rubber: 12.8 mm plug diameter, 21.1 mm sleeve length, for 24/40 joints (Z10-145-1, Aldrich Chemical, Milwaukee, Wis.) or equivalent; Parafilm M™ (Fisher Scientific, catalog number: 13-374-10. Phone(U.S.): 1-800-766-7000 or by Internet at www.fishersci.com); Pipets: 5 mL and 10 mL; Magnetic stirring motor and 2.5 cm magnetic stirring bar.

b. Reagents (Note: All reagents should be prepared fresh on the day of use.)

$CO_2$-free, distilled water. Degas 2 L of water to remove dissolved $CO_2$ either by: 1) boiling the water for 15 minutes, and cooling under an adequate cover, 2) bubbling nitrogen through the water using an adequate stainless steel mesh diffuser, or by 3) by vacuuming in a stoppered side-arm Erlenmeyer flask. Adjust pH to 8.0 with 0.1 N NaOH (500 mL water to 0.5 mL of 0.1 N NaOH). In all cases, store in a tightly closed container to prevent accumulation of $CO_2$ from the atmosphere.

0.057 M sodium bicarbonate ($NaHCO_3$) standard solution. Accurately weigh 0.477 g reagent grade $NaHCO_3$ into a 100 mL volumetric flask. Fill flask to 100 mL with pH 8 $CO_2$-free, distilled water. This solution contains the equivalent of 2.5 mg of $CO_2$ per mL.

1 N $H_2SO_4$. Slowly add 8.3 mL concentrated sulfuric acid to 291.7 mL distilled water. This makes 300 mL of 1N $H_2SO_4$.

c. Standard Curve

Construct a standard curve by adding known volumes of the standard sodium bicarbonate solution to both water (for initial experiments) and dairy products and plotting $CO_2$ concentration (PPM) in sample against % $CO_2$ in headspace. To a 25 g sample (or 25 mL of water) add 0, 1, 2, 4, 6, 8, 10 mL of the 0.057 M sodium bicarbonate solution and wash the neck of the flask with 10, 9, 8, 6, 4, 2, 0 mL of degassed, distilled water, respectively. This represents $CO_2$ concentrations of 0, 100, 200, 400, 600, 800, 1000 mg/kg (PPM). Then add 5 ml $H_2SO_4$ and seal the flask as described below in the sample analysis section. NOTE: Standards must be prepared with the same technique for closing the flask using either a septum or Parafilm M™. Observe the general comments for repeatability of sample analysis also described below.

Construction of the standard curve. Regression analysis of the curve should yield a straight line with a $r^2$ of >0.95. It is recommended to construct a curve with water samples first followed by dairy product. If the curve does not go through zero it indicates that the blank material (water or dairy product) contained $CO_2$. However, the standard curve can still be used if a good linear regression is obtained. See FIG. 2 for a sample standard curve.

d. Analysis

Place 25 g (±0.1 g) sample into 125 mL Erlenmeyer flask with magnetic stirring. Wash neck of flask with 10 mL degassed, distilled water (pH 8). Add 5 mL 1 N $H_2SO_4$ and immediately stopper with rubber septum or stretchable wax-like sheet of Parafilm M™. When a septum is used, fold down the sleeve of the septum to ensure a tight seal over the flask. When using Parafilm M™: Cut approximately a 12×6 cm rectangle of a Parafilm M™ sheet, fold it in half to form a 6×6 cm square, and stretch it across the top of the flask and evenly pull it down on all sides of the flask neck, giving the material a slight twist to make an even gas tight seal. For either closure: Place the flask on a magnetic stirring plate, and mix at a moderate speed for 5 minutes. At the end of the 5 minutes, turn of the stir plate, and sample the headspace gas with the syringe system supplied by the manufacturer of the gas analyzer. If the gas analyzer requires manual sampling, then inject 10 mL of headspace gas into analyzer port and read the % carbon dioxide.

NOTE: To ensure maximum repeatability in this method it is advisable to keep constant the following: flask size, stirring bar size, and stirring speeds. Further, do not use more than one flask at a time on stir plates designed with a single magnetic field control. Otherwise, sample positioning cannot be controlled to achieve uniform mixing conditions among all samples, and this could lead to incorrect gas headspace values.

e. Calculations

The amount of $CO_2$ in a product is determined by measuring the % $CO_2$ in the headspace and referring to the standard curve made with that same product.

C. Thermal Death and Enumeration of Survivors

Thermal inactivation of *Pseudomonas fluorescens* R1-232 in control and $CO_2$ treated (660, 920, 1580 ppm) milk were performed in duplicate in a circulating water bath (Forma Scientific, Marieta, Ohio) at 50° C. Temperature of the bath was monitored by a calibrated mercury thermometer. Tubes were aseptically removed at 0, 5, 10, 15, 20, 25, and 35 minutes, cooled for 30 seconds in an ice water bath, rinsed in 70% ethanol, and crushed with a glass rod in 10 ml of sterile 0.01 M phosphate buffer. Serial dilutions were prepared from the crushed and diluted capillary tubes, plated (in duplicate) on TSA plates using the spread plate method (Marshall, 1993), incubated at 29° C., and counted after 36 hours (Quebec Colony Counter).

D. Statistical Analysis $D_{50° C.}$ values were calculated from the slope of the plots of the average log counts of survivors versus heating time for each treatment. A general linear model (Minitab Release 12, Minitab Inc., State College, Pa.) was used to determine the slope and regression for each treatment and to determine if the differences were significant ($p \leq 0.05$). $D_{50° C.}$ values obtained at different $CO_2$ concentrations were regressed against the concentration of $CO_2$ to obtain the relationship between $CO_2$ concentration and thermal death times.

E. Results

Figure 2:
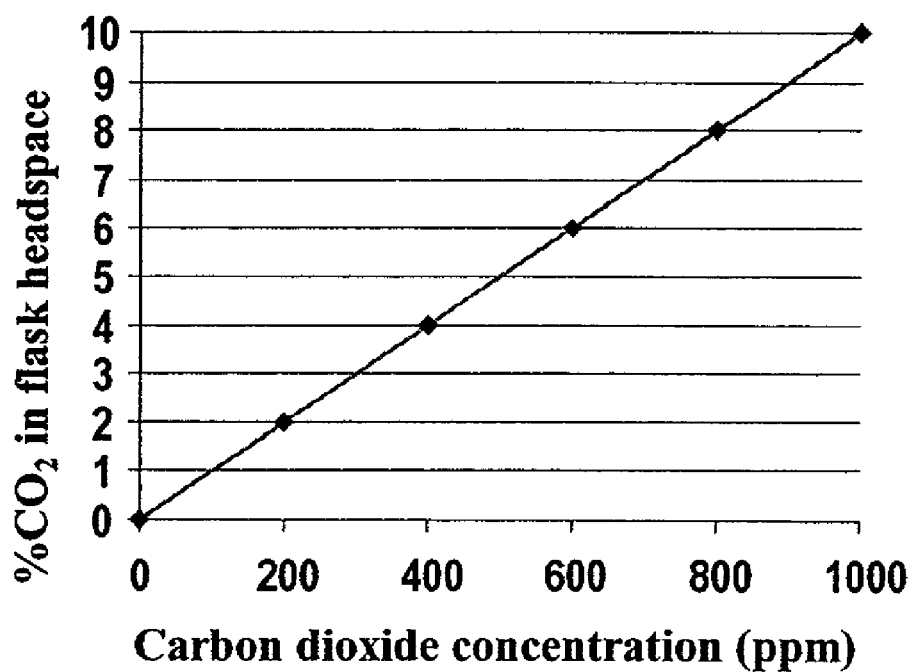
FIG. 2 depicts a sample standard curve using an infrared gas headspace analyzer.
Figure 3:
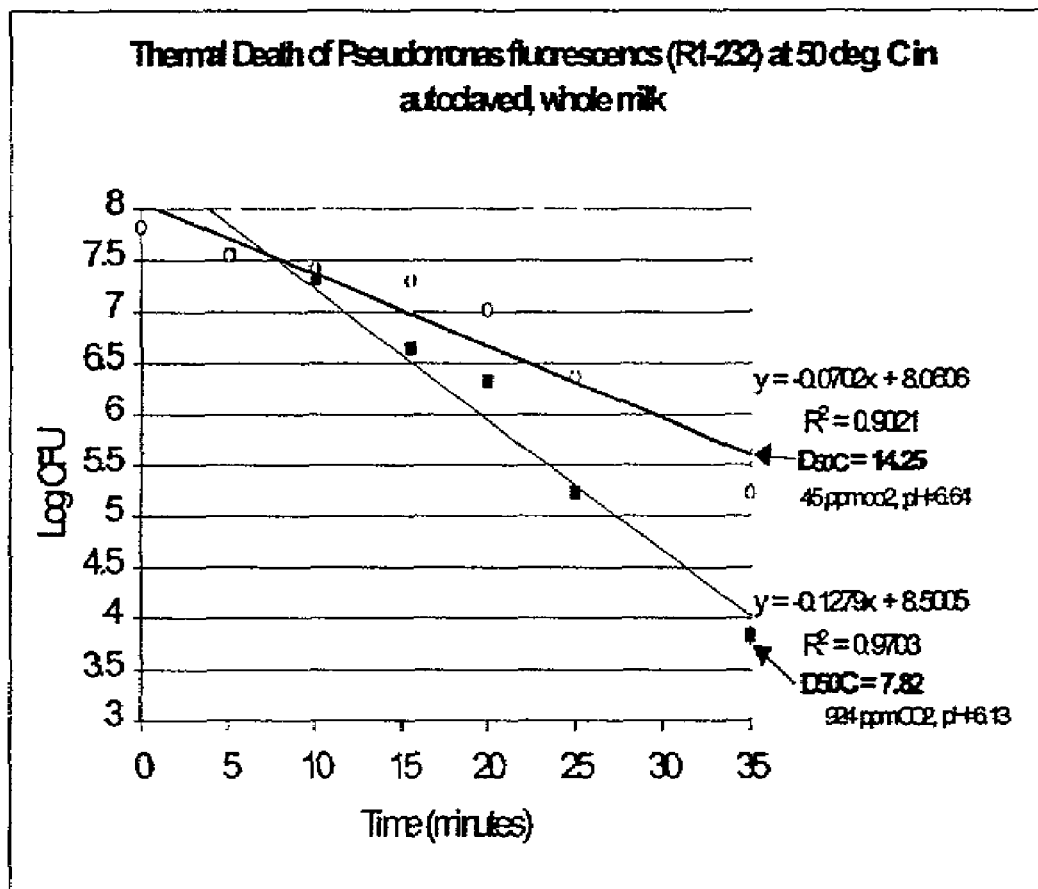
FIG. 3 is a graph showing thermal death curves for *Pseudomonas fluorescens* R1-232 in milk at 50° C. with and without 920 ppm $CO_2$.
Figure 4:
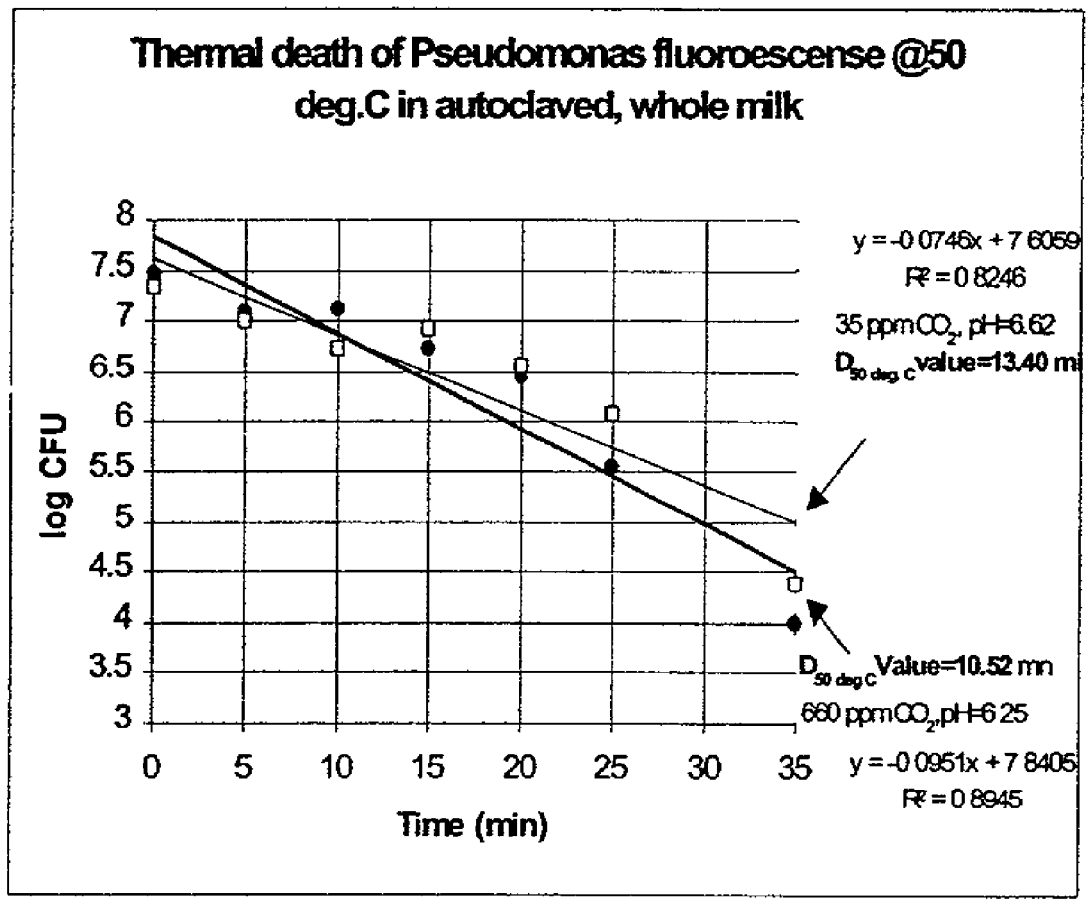
FIG. 4 is a graph showing thermal death curves for *Pserdomonas fluorescens* R1-232 in milk at 50° C. with and without 660 ppm $CO_2$.
Figure 5:
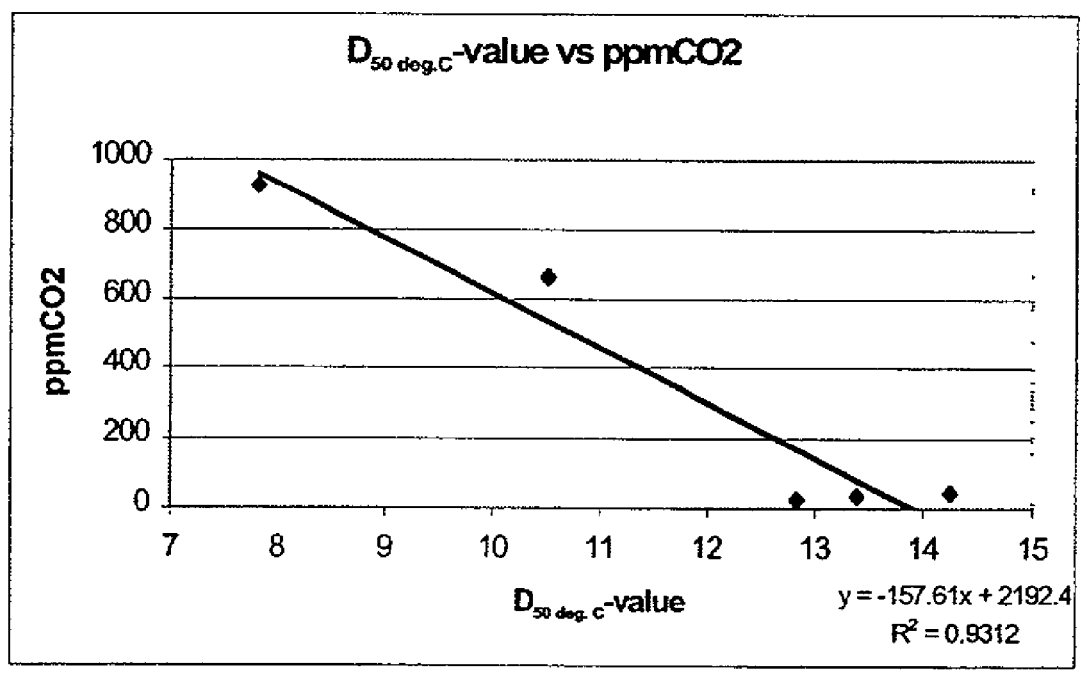
FIG. 5 is a graph showing the effect of ppm $CO_2$ on $D_{50° C.}$ values.

The addition of $CO_2$ significantly reduced the thermal death time for *Pseudomonas fluorescens* R1-232. For example, the $D_{50° C.}$ values in milk containing 920 and 660 ppm $CO_2$ were 7.82 and 10.52 minutes respectively (FIGS. 3&4). Similarly treated samples not containing $CO_2$ had $D_{50° C.}$ values of 14.25 and 13.40 minutes respectively. This represents 45 and 21% reductions in $D_{50° C.}$ values, respectively. $D_{50° C.}$ values decreased in a linear fashion as the concentration of $CO_2$ increased (FIG. 2). The slopes of $CO_2$ treatment and control thermal death curves were significant at p values of 0.020 and 0.045 for 920 and 660 ppm respectively.

The pH of milk with dissolved $CO_2$ at 660, 920, and 1580 ppm, was 6.25, 6.13, and 6.04 respectively. The respective pHs of the control milks were 6.62, 6.64, and 6.71.

The 1580 ppm treatment resulted in too few organisms to count and thermal death times that were too short to enumerate survivors under the temperature-time conditions of these experiments (50 C.-20 min.). A 7 log reduction (7D reduction) in counts was observed after 20 minutes at the highest $CO_2$ concentrations, whereas controls had only a 2 log reduction at this time. Thus, there is a substantial positive effect of dissolved $CO_2$ on the thermal inactivation of *Pseudomonas fluorescens* R1-232.

References

Devlieghere, F. et al., *Int. J. Food Micro.*, 43:105–113 (1998).

Dixon, N., Kell, D., *J. Applied Bacteriol.*, 67:109–136 (1989).

Grant, I. et al., *Lett. Appl. Micobiol.*, 26:166–170 (1998).

King, J., Mabbitt, L., *J. Dairy Research*, 49:439–447 (1982).

Michalski, C. et al., *J. Food Protection*, 62(2):112–117 (1999).

Marshall, R E., Standard Methods for the Examination of Dairy Products, 16$^{th}$ Ed.

American Public Health Association, Washington, D.C. (1993).

Nilsson, L. et al., *Appl. Environ. Micro.*, 66(2):769–774 (2000).

All publications, patents and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A process to inhibit or reduce the growth of bacteria and other pathogens in a liquid, comprising:

a. sparging carbon dioxide ($CO_2$) into the liquid, wherein the concentration of $CO_2$ in the liquid is from about 400–2000 ppm;

b. thermally inactivating the bacteria and other pathogens in the liquid, wherein the added $CO_2$ cooperates to increase the efficacy of the thermal inactivation process; and c. removing free $CO_2$ from the liquid upon completion of the thermal inactivation process by application of a vacuum.

2. A process to enhance the efficacy of a thermal inactivation process of a liquid, comprising:

a. sparging carbon dioxide ($CO_2$) into the liquid, wherein the concentration of $CO_2$ in the liquid is from about 400–2000 ppm;

b. thermally processing the liquid;

wherein the added $CO_2$ cooperates with the thermal inactivation process so that the death rate of bacteria and other pathogens in the liquid is increased over the death rate that occurs during thermal inactivation carried out in the absence of the added $CO_2$; and c. removing free $CO_2$ from the liquid upon completion of the thermal inactivation process by application of a vacuum.

3. The process of claim 1, wherein the cooperative effect of the added $CO_2$ and the thermal inactivation process results in a reduction of undesirable biological changes in the liquid.

4. The process of claim 2, wherein the cooperative effect of the added $CO_2$ and the thermal inactivation process results in a reduction of undesirable biological changes in the liquid.

5. The process of any of claims 1, 2, 3, or 4, wherein the shelf life of the liquid is increased thereby.

6. The process of any of claims 1, 2, 3, or 4, wherein the liquid comprises a dairy product, a vegetable juice, a fruit juice, a plant extract, a fungal extract, or a combination thereof.

7. The process of claim 6, wherein the liquid comprises a dairy product.

8. The process of claim 7, wherein the dairy product is milk.

9. The process of any of claims 1, 2, 3, or 4, wherein the liquid contains one or more flavoring agents.

10. The process of claim 9, wherein the flavoring agent is a fruit flavor, vegetable flavor, chocolate flavor, vanilla flavor, soft drink flavor, or malt flavor.

* * * * *